Masao Aida &
Keizo Ishizaki 3,036,205
COVERED ARC WELDING ELECTRODE
Masao Aida and Keizo Ishizaki, Tokyo-to, Japan, assignors to Yawata Welding Electrode Co., Ltd., Tokyo-to, Japan
Filed July 24, 1959, Ser. No. 829,239
Claims priority, application Japan Oct. 31, 1958
5 Claims. (Cl. 219—146)

The present invention relates to an improved covered arc welding electrode, more specifically a covered arc welding electrode so improved as to be able to display very good working characteristics in welding operation.

The conventional covered arc welding electrode has a solid, round rod as core wire and this wire is usually coated with a single kind of mixed flux. When this wire is of particularly large diameter, the working characteristics of the electrode are poor, showing drop form transfer. It is due to a great surface tension developing at the globule formed at the wire tip. In consequence, the composition of deposit steel changes, leaving blow-holes and coarsened pattern of bead waves; thus it is impossible to gain a beautiful appearance of weld.

In an effort to eliminate these defects of conventional electrodes, various attempts have been made. For instance, a double-coated electrode with claimed superiority in working characteristic was proposed. But this type of electrode has the drawback that it is hard to manufacture, consequently uneconomical.

Meanwhile, as automatic welding electrode core wire there is available a tubular core wire which includes within itself a flux and deoxidizing agents. However, as manual arc welding electrode core wire this is unfit for practical purpose, for it cannot form the so-called "sheath," as a result it has poor arc concentration and lacks good working characteristic.

On the other hand there is another type of electrode that contains abundant quantities of pulverized alloying elements within and is covered on the outside with an extremely thin coat. This type is utilized only for surface hardening and reinforcement.

Further there is the so-called iron powder type electrode of recent development, which has heavy content of iron powder in the coating. On the merits of excellent working characteristics and high efficiency it is increasingly winning popularity.

This type of core wire, it is true, gives satisfactory results, but it needs proper care to the problem of insulation.

As the foregoing shows, the major purpose of this invention is to overcome the traditional difficulties with covered electrodes and offer an improved covered arc welding electrode excelling among others in working characteristics, that is fine spray transferability.

The present invention can produce a covered arc welding electrode, the feature of which is the flux (slag-forming agent) or the gas-generating agent that fills the void of core wire, circular in section.

The present invention originates from the discovery that when the electrode is partitioned in the cross-section by flux into several compartments, the surface tension acting on each globule forming from such subdivided section becomes vastly smaller and the globule, making an ideal spray-particle, transfers to the base metal, resulting in good working characteristic, arc stability, fine appearance of deposit metal and other favourable effects.

The invention will be further described with reference to the attached drawings, in which—

Figure 1:
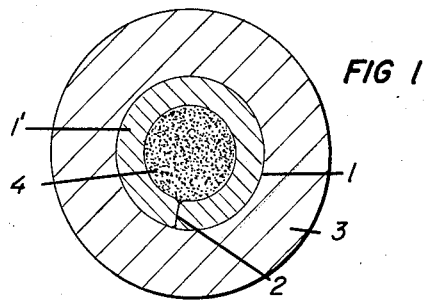
FIG. 1 is the cross-sectional view of a typical electrode manufactured in accordance with the present invention.

Now to explain the typical electrode of this invention with reference to FIG. 1, the electrode core wire consists of a circular ring 1' having a circular contour 1 and the inside 4 and outside 3 of this ring are filled with fluxes.

This ring or more aptly a tube can be formed by different methods. One method is to make a metal sheet or strip into cylindrical shape, using the die or cold-forming machine, and join both ends at 2.

The inner flux 4 is wrapped in the cylinder when the latter is formed and the outer flux 3 can be applied, using the common extrusion-type coating machine. Any other adequate method may be adopted for applying the flux.

The electrode thus produced can do with one coating process, accordingly is easier to manufacture than the conventional double-coated electrode, and yet an equally good effect is expected from the two fluxes, inside and outside.

Moreover definite division of fluxes warrants uniformity of product, and by enclosing a flux of poor coatability in the inside, it becomes practicable to produce with ease various types of electrodes traditionally found difficult to prepare. Further, unlike the solid core wire, in this case the surface tension acting on the globule is so much reduced that the metal transfer to the base metal takes place with more ease than in the case of the conventional double-coated core wire and assumes the ideal form of spraying. If this effect alone is pursued, both the inner and the outer flux may be of one and the same grade.

Figure 2:
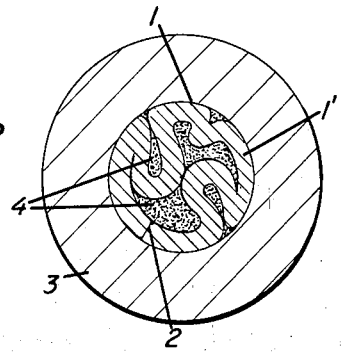
FIGS. 2 to 4 represent the cross-sections of desirable variations other than the above of electrodes also manufactured in accordance with the present invention.
Figure 3:
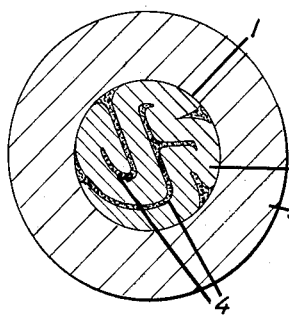

Referring to FIGS. 2 and 3, variations of the above basic type are described in the following.

The part 1 of wire section is circular and the area within this ring is partitioned into two divisions: 1', tortuous route and 4, flux layer filling the boundary of the route; the continuity of this tortuous route is desirable. Such wire is coated by using the common extrusion-type coating machine. Thus the electrode is manufactured.

Such wire may be produced by any appropriate process, for example a thin metal sheet of suitable thickness and width can be folded several times to enclose flux within and easily made into a form with its section circular in the outline by putting it through the wire-drawing machine or the cold-forming machine. If need be, it may be formed while at the same time being twisted in the longitudinal direction.

The chief object of this variation is to use a thinner metal sheet as material and obtain an adequate sectional density of metal in relation to wire diameter, so that the metal globule may be further subdivided for better transferability.

Figure 4:
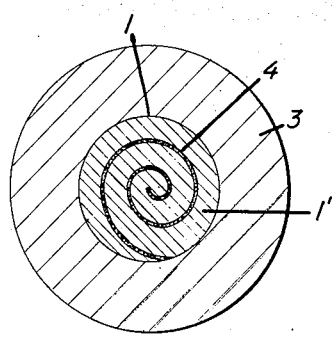

FIG. 4 shows another variation with a spiral pattern in the section, designed for similar effect.

It is possible in these wires to fill different kinds of fluxes in the discontinuous voids.

Any kind of flux may be used to fill the inside of core wire, so far as it can influence the globule to improve its transferability. Namely, slag-forming agents commonly used for outer covering of electrodes like various oxides and fluorides, and/or gas-generating agents like lime stone, organic substances that can generate gas through thermal decomposition or evaporation are main components with possible additions of arc stabilizers such as sodium carbonate or potassium carbonate, deoxidizing agents and some alloying elements or iron powder, usually contained in arc welding electrode covering.

The core wire material can be mild steel or stainless steel or copper or whatever metal, depending on the type of electrode to be manufactured.

When arc welding is executed using these electrodes, the globule molten at the wire tip by arc heat splits into finer particles, and, floating on the gas emitted from the decomposing fluxes inside and outside, transfers to the work to be welded. In consequence the arc becomes greatly stabilized and an ideal working characteristic is displayed. And the deposit metal after freezing presents an exceedingly pleasing appearance with less convexity and finer waves than usual. In this case interaction between flux and core wire becomes uniform and as a result blow-holes, particularly at the start of bead, are drastically reduced, leading to improvement of mechanical properties.

The following are some examples of actual applications of the present invention.

(1) *Low-Hydrogen Type Mild Steel Welding Electrode and Other Mild or Low Alloy Steel Electrode*

A mixture of 50% iron powder and 50% lime stone was filled into a mild steel tube, 6.05 mm. outer diameter and 3.15 mm. inner diameter; and the conventional low-hydrogen type covering was provided on the exterior.

In comparison with common low-hydrogen type electrodes, the new electrode has the following features:

(1) Whereas the former makes a drop-form transfer to the work, the latter makes a spray-form transfer, which gives high arc stability.

(2) The arc looks relatively intense but it causes no particularly deep penetration, with reduced undercutting and good affinity of bead to base metal.

(3) Bead looks flat. Particularly in the case of fillet welding, the new electrode produces a good bead equivalent to that given by the high iron oxide type electrode, and not such a convex bead as is peculiar to the low-hydrogen type.

Similarly the same feature was obtained in the case of mild or low allow steel electrode.

(2) *Aluminum Steel Welding Electrode and High-Alloy Build-Up Welding Electrode*

A mixture of 70% aluminum and 30% barium carbonate (gas-generating agent) was filled into a mild steel tube, 4.95 mm. outer diameter and 2.7 mm. inner diameter. As compared with the common arc welding electrode with the core wire metal identical with the work, which is characterized by extremely poor transferability of globule on account of high viscosity of molten metal, the new electrode with a tubular core wire offers very satisfactory transferability of globule and improves bead appearance.

Similarly, a tubular core wire was adopted for electrodes intended for high-speed steel and it was confirmed that the core wire filled with slag-forming and gas-generating agents and some alloying elements could give an equally good working characteristic.

(3) *Cast-Iron Welding Electrode*

In like manner, the core wire containing carbon and ferrosilicon as graphitizing agents in addition to slag-forming and gas-generating agents gave very smooth transfer of globule and caused fast reaction of core wire to C and Si, as a result producing a perfectly-graphitized cast iron in the deposit and preventing overheating of electrode, the common drawback of cast iron core wire.

If Mg or Mg alloy is used as gas-generating agent, an excellent working characteristic will be attained and at the same time the deposit will become spheroidal graphite cast iron.

What we claim is:

1. An electrode for manual electric arc welding, comprising a continuous outside layer of a first flux, said outside layer consisting of a hollow cylinder, a metal core extending continuously along the length of the inside of said hollow cylinder and extending sinuously across the cross section of the inside of said hollow cylinder, said metal core having a plurality of separate and unconnected voids along the length thereof, at least one of which voids opens outwardly from said metal core, and at least one further flux in said voids, said flux being retained in said void opening outwardly from the metal core by said outside layer of a first flux.

2. An electrode as claimed in claim 1 in which there is only one further flux in said voids.

3. An electrode as claimed in claim 1 in which there are a plurality of different further fluxes in said voids.

4. An electrode as claimed in claim 1 in which the cross sectional area of said metal core is greater than half the cross sectional area of the hollow within the hollow cylinder.

5. An electrode for manual electric arc welding, comprising a continuous outside layer of a first flux, said outside layer consisting of a hollow cylinder, a metal core extending continuously along the length of the inside of said hollow cylinder and extending spirally around the inside of the hollow cylinder with the spires spaced from each other, and a further flux between the spires of said metal core.

References Cited in the file of this patent

UNITED STATES PATENTS

| | | |
|---|---|---|
| 2,050,271 | Candy | Aug. 11, 1936 |
| 2,465,503 | Woods | Mar. 29, 1949 |
| 2,951,931 | Danhier | Sept. 6, 1960 |